United States Patent
Lesso

(10) Patent No.: US 11,704,397 B2
(45) Date of Patent: *Jul. 18, 2023

(54) DETECTION OF REPLAY ATTACK

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/074,743

(22) Filed: Oct. 20, 2020

(65) Prior Publication Data

US 2021/0034730 A1 Feb. 4, 2021

Related U.S. Application Data

(63) Continuation of application No. 16/018,795, filed on Jun. 26, 2018, now Pat. No. 10,853,464.

(Continued)

(51) Int. Cl.
| | |
|---|---|
| G06F 21/32 | (2013.01) |
| H04L 9/32 | (2006.01) |
| G10L 25/03 | (2013.01) |
| G10L 17/02 | (2013.01) |
| H04K 1/00 | (2006.01) |
| H04L 9/40 | (2022.01) |

(Continued)

(52) U.S. Cl.
CPC ......... G06F 21/32 (2013.01); G01R 33/0094 (2013.01); G06F 21/554 (2013.01); G10L 15/24 (2013.01); G10L 17/02 (2013.01); G10L 17/26 (2013.01); G10L 25/03 (2013.01); H04K 1/00 (2013.01); H04L 9/3231 (2013.01); H04L 63/0861 (2013.01); H04L 63/1466 (2013.01); H04L 63/1483 (2013.01); H04W 12/122 (2021.01); H04R 3/00 (2013.01); H04R 3/005 (2013.01); H04R 2499/13 (2013.01)

(58) Field of Classification Search
USPC ............... 704/246, 247, 251, 252, 270–271
See application file for complete search history.

(56) References Cited

U.S. PATENT DOCUMENTS

| | | |
|---|---|---|
| 5,197,113 A | 3/1993 | Mumolo |
| 5,568,559 A | 10/1996 | Makino |

(Continued)

FOREIGN PATENT DOCUMENTS

| | | |
|---|---|---|
| AU | 2015202397 B2 | 5/2015 |
| CN | 1497970 A | 5/2004 |

(Continued)

OTHER PUBLICATIONS

Wu, Libing, et al., LVID: A Multimodal Biometricas Authentication System on Smartphones, IEEE Transactions on Information Forensics and Security, Vo. 15, 2020, pp. 1572-1585.

(Continued)

*Primary Examiner* — Leonard Saint-Cyr
(74) *Attorney, Agent, or Firm* — Jackson Walker L.L.P.

(57) ABSTRACT

In order to detect a replay attack in a speaker recognition system, at least one feature is identified in a detected magnetic field. It is then determined whether the at least one identified feature of the detected magnetic field is indicative of playback of speech through a loudspeaker. If so, it is determined that a replay attack may have taken place.

20 Claims, 11 Drawing Sheets

Related U.S. Application Data

(60) Provisional application No. 62/526,013, filed on Jun. 28, 2017.

(51) Int. Cl.
  *G06F 21/55* (2013.01)
  *H04W 12/122* (2021.01)
  *G01R 33/00* (2006.01)
  *G10L 15/24* (2013.01)
  *G10L 17/26* (2013.01)
  *H04R 3/00* (2006.01)

(56) References Cited

U.S. PATENT DOCUMENTS

| | | |
|---|---|---|
| 5,710,866 A | 1/1998 | Alleva et al. |
| 5,787,187 A | 7/1998 | Bouchard et al. |
| 5,838,515 A | 11/1998 | Mortazavi et al. |
| 6,182,037 B1 | 1/2001 | Maes |
| 6,229,880 B1 | 5/2001 | Reformato et al. |
| 6,249,237 B1 | 6/2001 | Prater |
| 6,343,269 B1 | 1/2002 | Harada et al. |
| 6,480,825 B1 | 11/2002 | Sharma et al. |
| 7,016,833 B2 | 3/2006 | Gable et al. |
| 7,039,951 B1 | 5/2006 | Chaudhari et al. |
| 7,418,392 B1 | 8/2008 | Mozer et al. |
| 7,492,913 B2 | 2/2009 | Connor et al. |
| 8,442,824 B2 | 5/2013 | Aley-Raz et al. |
| 8,489,399 B2 | 7/2013 | Gross |
| 8,577,046 B2 | 11/2013 | Aoyagi |
| 8,856,541 B1 | 10/2014 | Chaudhury et al. |
| 8,997,191 B1 | 3/2015 | Stark et al. |
| 9,049,983 B1 | 6/2015 | Baldwin |
| 9,171,548 B2 | 10/2015 | Valius et al. |
| 9,305,155 B1 | 4/2016 | Vo et al. |
| 9,317,736 B1 | 4/2016 | Siddiqui |
| 9,390,726 B1 | 7/2016 | Smus et al. |
| 9,430,629 B1 | 8/2016 | Ziraknejad et al. |
| 9,484,036 B2 | 11/2016 | Kons et al. |
| 9,548,979 B1 | 1/2017 | Johnson et al. |
| 9,600,064 B2 | 3/2017 | Lee et al. |
| 9,613,640 B1 | 4/2017 | Balamurali et al. |
| 9,641,585 B2 | 5/2017 | Kvaal et al. |
| 9,646,261 B2 | 5/2017 | Agrafioli et al. |
| 9,659,562 B2 | 5/2017 | Lovitt |
| 9,665,784 B2 | 5/2017 | Derakhshani et al. |
| 9,706,304 B1 | 7/2017 | Kelso et al. |
| 9,865,253 B1 | 1/2018 | De Leon et al. |
| 9,984,314 B2 | 5/2018 | Philipose et al. |
| 9,990,926 B1 | 6/2018 | Pearce |
| 10,032,451 B1 | 7/2018 | Mamkina et al. |
| 10,063,542 B1 | 8/2018 | Kao |
| 10,079,024 B1 | 9/2018 | Bhimanaik et al. |
| 10,097,914 B2 | 10/2018 | Petrank |
| 10,192,553 B1 | 1/2019 | Chenier et al. |
| 10,204,625 B2 | 2/2019 | Mishra et al. |
| 10,210,685 B2 | 2/2019 | Borgmeyer |
| 10,255,922 B1 | 4/2019 | Sharifi et al. |
| 10,277,581 B2 | 4/2019 | Chandrasekharan et al. |
| 10,305,895 B2 | 5/2019 | Barry et al. |
| 10,318,580 B2 | 6/2019 | Topchy et al. |
| 10,334,350 B2 | 6/2019 | Petrank |
| 10,339,290 B2 | 7/2019 | Valendi et al. |
| 10,460,095 B2 | 10/2019 | Boesen |
| 10,467,509 B2 | 11/2019 | Albadawi et al. |
| 10,692,492 B2 | 6/2020 | Rozen et al. |
| 10,733,987 B1 | 8/2020 | Govender et al. |
| 10,847,165 B2 | 11/2020 | Lesso |
| 10,915,614 B2 | 2/2021 | Lesso |
| 10,977,349 B2 | 4/2021 | Suh et al. |
| 11,017,252 B2 | 5/2021 | Lesso |
| 11,023,755 B2 | 6/2021 | Lesso |
| 11,037,574 B2 | 6/2021 | Lesso |
| 11,051,117 B2 | 6/2021 | Lesso |
| 11,164,588 B2 | 11/2021 | Alonso et al. |
| 11,276,409 B2 | 3/2022 | Lesso |
| 2002/0169608 A1 | 11/2002 | Tamir et al. |
| 2002/0194003 A1 | 12/2002 | Mozer |
| 2003/0033145 A1 | 2/2003 | Petrushin |
| 2003/0177006 A1 | 9/2003 | Ichikawa et al. |
| 2003/0177007 A1 | 9/2003 | Kanazawa et al. |
| 2003/0182119 A1 | 9/2003 | Junqua et al. |
| 2004/0030550 A1 | 2/2004 | Liu |
| 2004/0141418 A1 | 7/2004 | Matsuo et al. |
| 2004/0230432 A1 | 11/2004 | Liu et al. |
| 2005/0060153 A1 | 3/2005 | Gable et al. |
| 2005/0107130 A1 | 5/2005 | Peterson, II |
| 2005/0171774 A1 | 8/2005 | Applebaum et al. |
| 2006/0116874 A1 | 6/2006 | Samuelsson et al. |
| 2006/0171571 A1 | 8/2006 | Chan et al. |
| 2007/0055517 A1 | 3/2007 | Spector |
| 2007/0129941 A1 | 6/2007 | Tavares |
| 2007/0185718 A1 | 8/2007 | Di Mambro et al. |
| 2007/0233483 A1 | 10/2007 | Kuppuswamy et al. |
| 2007/0250920 A1 | 10/2007 | Lindsay |
| 2007/0276658 A1 | 11/2007 | Douglass |
| 2008/0040615 A1 | 2/2008 | Carper et al. |
| 2008/0071532 A1 | 3/2008 | Ramakrishnan et al. |
| 2008/0082510 A1 | 4/2008 | Wang et al. |
| 2008/0223646 A1 | 9/2008 | White |
| 2008/0262382 A1 | 10/2008 | Akkermans et al. |
| 2008/0285813 A1 | 11/2008 | Holm |
| 2009/0087003 A1 | 4/2009 | Zurek et al. |
| 2009/0105548 A1 | 4/2009 | Bart |
| 2009/0167307 A1 | 7/2009 | Kopp |
| 2009/0232361 A1 | 9/2009 | Miller |
| 2009/0281809 A1 | 11/2009 | Reuss |
| 2009/0319270 A1 | 12/2009 | Gross |
| 2010/0004934 A1 | 1/2010 | Hirose et al. |
| 2010/0076770 A1 | 3/2010 | Ramaswamy |
| 2010/0106502 A1* | 4/2010 | Farrell .............. G10L 17/24 704/E17.001 |
| 2010/0106503 A1* | 4/2010 | Farrell .............. G10L 17/04 704/E17.001 |
| 2010/0204991 A1 | 8/2010 | Ramakrishnan et al. |
| 2010/0328033 A1 | 12/2010 | Kamei |
| 2011/0051907 A1 | 3/2011 | Jaiswal et al. |
| 2011/0075857 A1 | 3/2011 | Aoyagi |
| 2011/0142268 A1 | 6/2011 | Iwakuni et al. |
| 2011/0246198 A1 | 10/2011 | Asenjo et al. |
| 2011/0276323 A1 | 11/2011 | Seyfetdinov |
| 2011/0314530 A1 | 12/2011 | Donaldson |
| 2011/0317848 A1 | 12/2011 | Ivanov et al. |
| 2012/0110341 A1 | 5/2012 | Beigi |
| 2012/0223130 A1 | 9/2012 | Knopp et al. |
| 2012/0224456 A1 | 9/2012 | Visser et al. |
| 2012/0249328 A1 | 10/2012 | Xiong |
| 2012/0323796 A1 | 12/2012 | Udani |
| 2013/0024191 A1 | 1/2013 | Krutsch et al. |
| 2013/0058488 A1 | 3/2013 | Cheng et al. |
| 2013/0080167 A1 | 3/2013 | Mozer |
| 2013/0132091 A1 | 5/2013 | Skerpac |
| 2013/0225128 A1 | 8/2013 | Gomar |
| 2013/0227678 A1 | 8/2013 | Kang |
| 2013/0247082 A1 | 9/2013 | Wang et al. |
| 2013/0279297 A1 | 10/2013 | Wulff et al. |
| 2013/0279724 A1 | 10/2013 | Stafford et al. |
| 2013/0289999 A1 | 10/2013 | Hymel |
| 2014/0059347 A1 | 2/2014 | Dougherty et al. |
| 2014/0149117 A1 | 5/2014 | Bakish et al. |
| 2014/0172430 A1 | 6/2014 | Rutherford et al. |
| 2014/0188770 A1 | 7/2014 | Agrafioti et al. |
| 2014/0237576 A1 | 8/2014 | Zhang et al. |
| 2014/0241597 A1 | 8/2014 | Leite |
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1 | 11/2014 | Jia et al. |
| 2014/0343703 A1 | 11/2014 | Topchy et al. |
| 2014/0358353 A1 | 12/2014 | Ibanez-Guzman et al. |
| 2014/0358535 A1 | 12/2014 | Lee et al. |
| 2015/0006163 A1 | 1/2015 | Liu et al. |
| 2015/0028996 A1 | 1/2015 | Agrafioti et al. |
| 2015/0033305 A1 | 1/2015 | Shear et al. |

(56) References Cited

U.S. PATENT DOCUMENTS

| | | |
|---|---|---|
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |
| 2015/0276254 A1 | 10/2015 | Nemcek et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0007118 A1 | 1/2016 | Lee et al. |
| 2016/0026781 A1 | 1/2016 | Boczek |
| 2016/0066113 A1 | 3/2016 | Elkhatib et al. |
| 2016/0071516 A1 | 3/2016 | Lee et al. |
| 2016/0086607 A1 | 3/2016 | Aley-Raz et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0148012 A1* | 5/2016 | Khitrov .................. G06F 21/32 726/19 |
| 2016/0182998 A1 | 6/2016 | Galal et al. |
| 2016/0210407 A1 | 7/2016 | Hwang et al. |
| 2016/0217321 A1 | 7/2016 | Gottleib |
| 2016/0217795 A1 | 7/2016 | Lee et al. |
| 2016/0234204 A1 | 8/2016 | Rishi et al. |
| 2016/0248768 A1 | 8/2016 | McLaren et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2016/0372139 A1 | 12/2016 | Cho et al. |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1 | 4/2017 | Ady et al. |
| 2017/0134377 A1 | 5/2017 | Tokunaga et al. |
| 2017/0150254 A1 | 5/2017 | Bakish et al. |
| 2017/0161482 A1 | 6/2017 | Eltoft et al. |
| 2017/0162198 A1 | 6/2017 | Chakladar et al. |
| 2017/0169828 A1 | 6/2017 | Sachdev |
| 2017/0200451 A1 | 7/2017 | Bocklet et al. |
| 2017/0213268 A1 | 7/2017 | Puehse et al. |
| 2017/0214687 A1* | 7/2017 | Klein .................. H04L 63/0861 |
| 2017/0231534 A1 | 8/2017 | Agassy et al. |
| 2017/0242990 A1 | 8/2017 | Chien |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0293749 A1 | 10/2017 | Baek et al. |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1 | 12/2017 | Aviles-Casco Vaquero et al. |
| 2017/0373655 A1 | 12/2017 | Mengad et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060552 A1 | 3/2018 | Pellom et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0324518 A1 | 11/2018 | Dusan et al. |
| 2018/0330727 A1 | 11/2018 | Tulli |
| 2018/0336716 A1 | 11/2018 | Ramprashad et al. |
| 2018/0336901 A1 | 11/2018 | Masaki et al. |
| 2018/0342237 A1 | 11/2018 | Lee et al. |
| 2018/0349585 A1 | 12/2018 | Ahn et al. |
| 2018/0352332 A1 | 12/2018 | Tao |
| 2018/0357470 A1 | 12/2018 | Yang et al. |
| 2018/0358020 A1 | 12/2018 | Chen et al. |
| 2018/0366124 A1 | 12/2018 | Cilingir et al. |
| 2018/0374487 A1 | 12/2018 | Lesso |
| 2018/0376234 A1 | 12/2018 | Petrank |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0043512 A1 | 2/2019 | Huang et al. |
| 2019/0065478 A1 | 2/2019 | Tsujikawa et al. |
| 2019/0098003 A1 | 3/2019 | Ota |
| 2019/0103115 A1 | 4/2019 | Lesso |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149920 A1 | 5/2019 | Putzeys et al. |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0287536 A1 | 9/2019 | Sharifi et al. |
| 2019/0294629 A1 | 9/2019 | Wexler et al. |
| 2019/0295554 A1 | 9/2019 | Lesso |
| 2019/0304470 A1 | 10/2019 | Ghaemmaghami et al. |
| 2019/0306594 A1 | 10/2019 | Aumer et al. |
| 2019/0306613 A1 | 10/2019 | Qian et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0372969 A1 | 12/2019 | Chang et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |
| 2020/0184057 A1 | 6/2020 | Mukund |
| 2020/0204937 A1 | 6/2020 | Lesso |
| 2020/0227071 A1 | 7/2020 | Lesso |
| 2020/0265834 A1 | 8/2020 | Lesso et al. |
| 2020/0286492 A1 | 9/2020 | Lesso |
| 2021/0303669 A1 | 9/2021 | Lesso |
| 2021/0304775 A1 | 9/2021 | van den Berg |

(56) References Cited

U.S. PATENT DOCUMENTS

FOREIGN PATENT DOCUMENTS

| | | |
|---|---|---|
| CN | 1937955 A | 3/2007 |
| CN | 101228787 A | 7/2008 |
| CN | 101578637 A | 11/2009 |
| CN | 102246228 A | 11/2011 |
| CN | 103109495 A | 5/2013 |
| CN | 103477604 A | 12/2013 |
| CN | 104038625 A | 9/2014 |
| CN | 104252860 A | 12/2014 |
| CN | 104956715 A | 9/2015 |
| CN | 105185380 A | 12/2015 |
| CN | 105244031 A | 1/2016 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 106537889 A | 3/2017 |
| CN | 107251573 A | 10/2017 |
| EP | 1205884 A2 | 5/2002 |
| EP | 1600791 A1 | 11/2005 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| EP | 3466106 A1 | 4/2019 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| TW | 200820218 A | 5/2008 |
| WO | 9834216 A2 | 8/1998 |
| WO | 0208147 A1 | 10/2002 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |
| WO | 2019002831 A1 | 1/2019 |
| WO | 2019008387 A1 | 1/2019 |
| WO | 2019008389 A1 | 1/2019 |
| WO | 2019008392 A1 | 1/2019 |

OTHER PUBLICATIONS

Wang, Qian, et al., VoicePop: A Pop Noise based Anti-spoofing System for Voice Authentication on Smartphones, IEEE INFOCOM 2019—IEEE Conference on Computer Communications, Apr. 26-May 2, 2019, pp. 2062-2070.
Examination Report under Section 18(3), UKIPO, Application No. GB1918956.2, dated Jul. 29, 2021.
Examination Report under Section 18(3), UKIPO, Application No. GB1918965.3, dated Aug. 2, 2021.
Combined Search and Examination Report under Sections 17 and 18(3), UKIPO, Application No. GB2105613.0, dated Sep. 27, 2021.
Combined Search and Examination Report under Sections 17 and 18(3), UKIPO, Application No. GB2114337.5, dated Nov. 3, 2021.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, Herts., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Boesen, U.S. Appl. No. 62/403,045, filed Sep. 30, 2017.
Meng, Y. et al., "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
Toth, Arthur R., et al., Synthesizing Speech from Doppler Signals, ICASSP 2010, IEEE, pp. 4638-4641.
First Office Action, China National Intellectual Property Administration, Application No. 2018800720846, dated Mar. 1, 2021.
International Search Report and Written Opinion of the International Searching Authority, International Application No. PCT/GB2019/052302, dated Oct. 2, 2019.
Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.

(56) References Cited

OTHER PUBLICATIONS

Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", INTERSPEECH 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Further Search Report under Sections 17 (6), UKIPO, Application No. GB1719731.0, dated Nov. 26, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, dated Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
Combined Search and Examination Report under Sections 17 and 18(3), UKIPO, Application No. GB1803570.9, dated Aug. 21, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801664.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1809474.8, dated Jul. 23, 2018.
Ajmera, et al,, "Robust Speaker Change Detection," IEEE Signal Processing Letters, vol. 1, No. 8, pp. 649-651, Aug. 2004.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1713699.5, dated Feb. 21, 2018.
International Search Report and Written Opinion of the International Searching Authority, International Application No. PCT/GB2019/052143, dated Sep. 17, 2019.
Lucas, Jim, What Is Electromagnetic Radiation? Live Science, Mar. 13, 2015, NY, NY.
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Combined Search and Examination Report under Sections 17 and 18(3), UKIPO, Application No. GB2112228.8, dated May 17, 2022.
Search Report under Section 17, UKIPO, Application No. GB2202521.7, dated Jun. 21, 2022.
Combined Search and Examination Report under Sections 17 and 18(3), UKIPO, Application No. GB2210986.2, dated Nov. 15, 2022.
First Office Action, China National Intellectual Property Administration, Application No. 201800658351, dated Feb. 4, 2023.
Search Report, China National Intellectual Property Administration, Application No. 201800658351, dated Feb. 2, 2023.
First Office Action, China National Intellectual Property Administration, Patent Application No. 2018800452077, dated Feb. 25, 2023.
First Office Action, China National Intellectual Property Administration, Patent Application No. 2018800452787, dated Mar. 14, 2023.
First Office Action, China National Intellectual Property Administration, Patent Application No. 2018800419187, dated Feb. 28, 2023.
Notice of Preliminary Rejection, Korean Intellectual Property Office, Patent Application No. 10-2020-7002065, dated Apr. 17, 2023.
Notice of Preliminary Rejection, Korean Intellectual Property Office, Patent Application No. 10-2020-7002061, dated Apr. 27, 2023.

* cited by examiner

DETECTION OF REPLAY ATTACK

This application is a continuation of U.S. patent application Ser. No. 16/018,795, filed Jun. 26, 2018, which claims priority to U.S. Provisional Patent Application Ser. No. 62/526,013, filed Jun. 28, 2017, each of which is incorporated by reference herein in its entirety.

TECHNICAL FIELD

Embodiments described herein relate to methods and devices for detecting a replay attack on a voice biometrics system.

BACKGROUND

Voice biometrics systems are becoming widely used. In such a system, a user trains the system by providing samples of their speech during an enrolment phase. In subsequent use, the system is able to discriminate between the enrolled user and non-registered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

SUMMARY

According to an aspect of the present invention, there is provided a method of detecting a replay attack in a speaker recognition system. The method comprises: identifying at least one feature of a detected magnetic field; determining whether the at least one identified feature of the detected magnetic field is indicative of playback of speech through a loudspeaker; and if so, determining that a replay attack may have taken place.

The method may further comprise: receiving an audio signal representing speech, wherein the audio signal is received at substantially the same time as the magnetic field is detected; and if it is determined that the at least one identified feature of the detected magnetic field is indicative of playback of speech through a loudspeaker, determining that the audio signal may result from said replay attack.

The step of identifying at least one feature of the detected magnetic field may comprise: receiving a signal from a magnetometer; and performing a Discrete Fourier Transform on the received signal from the magnetometer.

The step of identifying at least one feature of the detected magnetic field may comprise: receiving a signal from a magnetometer; and detecting modulation of the at least one feature from the received signal from the magnetometer at frequencies in the range of 2 Hz-10 Hz, at the syllabic rate, and/or at the articulation rate. The syllabic rate and/or the articulation rate may correspond to typical rates for speech or for that specific type of speech or speaker, or may be determined by analysis of speech that is detected at the same time as the magnetic field is being detected.

The method may comprise determining whether a detected pattern of variability of the magnetic field is indicative of a reference pattern associated with playback of a predetermined spoken phrase through a loudspeaker.

Determining whether the detected pattern of variability of the magnetic field is indicative of a reference pattern associated with playback of a predetermined spoken phrase through a loudspeaker may comprise comparing the detected pattern of variability of the magnetic field with a stored reference pattern.

The stored reference pattern may correspond to the predetermined spoken phrase, as spoken by a specific enrolled user, or may correspond to the predetermined spoken phrase, as spoken by multiple speakers.

Determining whether the detected pattern of variability of the magnetic field is indicative of a reference pattern associated with playback of a predetermined spoken phrase through a loudspeaker may comprise passing the detected pattern of variability of the magnetic field to a classifier that has been trained with inputs obtained from playback of the predetermined spoken phrase through a loudspeaker.

According to a second aspect of the present invention, there is provided a system for detecting a replay attack in a speaker recognition system, the system being configured for: identifying at least one feature of a detected magnetic field; determining whether the at least one identified feature of the detected magnetic field is indicative of playback of speech through a loudspeaker; and if so, determining that a replay attack may have taken place.

The system may be further configured for: receiving an audio signal representing speech, wherein the audio signal is received at substantially the same time as the magnetic field is detected; and if it is determined that the at least one identified feature of the detected magnetic field is indicative of playback of speech through a loudspeaker, determining that the audio signal may result from said replay attack.

Identifying at least one feature of the detected magnetic field may comprise: receiving a signal from a magnetometer; and performing a Discrete Fourier Transform on the received signal from the magnetometer.

The system may be configured for identifying at least one feature of the detected magnetic field by: receiving a signal from a magnetometer; and detecting modulation of the at least one feature from the received signal from the magnetometer at frequencies in the range of 2 Hz-10 Hz.

The system may be configured for identifying at least one feature of the detected magnetic field by: receiving a signal from a magnetometer; and detecting modulation of the at least one feature from the received signal from the magnetometer at the syllabic rate.

The system may be configured for identifying at least one feature of the detected magnetic field by: receiving a signal from a magnetometer; and detecting modulation of the at least one feature from the received signal from the magnetometer at the articulation rate.

The system may be configured for determining whether a detected pattern of variability of the magnetic field is indicative of a reference pattern associated with playback of a predetermined spoken phrase through a loudspeaker.

The system may be configured for determining whether the detected pattern of variability of the magnetic field is indicative of a reference pattern associated with playback of a predetermined spoken phrase through a loudspeaker by: comparing the detected pattern of variability of the magnetic field with a stored reference pattern.

The stored reference pattern may correspond to the predetermined spoken phrase, as spoken by a specific enrolled user, or may correspond to the predetermined spoken phrase, as spoken by multiple speakers.

The system may be configured for determining whether the detected pattern of variability of the magnetic field is indicative of a reference pattern associated with playback of a predetermined spoken phrase through a loudspeaker by: passing the detected pattern of variability of the magnetic field to a classifier that has been trained with inputs obtained from playback of the predetermined spoken phrase through a loudspeaker.

According to an aspect of the present invention, there is provided a device comprising a system according to the second aspect. The device may comprise a mobile telephone, an audio player, a video player, a mobile computing platform, a games device, a remote controller device, a toy, a machine, or a home automation controller or a domestic appliance.

According to an aspect of the present invention, there is provided a computer program product, comprising a computer-readable tangible medium, and instructions for performing a method according to the first aspect.

According to an aspect of the present invention, there is provided a non-transitory computer readable storage medium having computer-executable instructions stored thereon that, when executed by processor circuitry, cause the processor circuitry to perform a method according to the first aspect.

According to an aspect of the present invention, there is provided a device comprising the non-transitory computer readable storage medium according to the previous aspect. The device may comprise a mobile telephone, an audio player, a video player, a mobile computing platform, a games device, a remote controller device, a toy, a machine, or a home automation controller or a domestic appliance.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
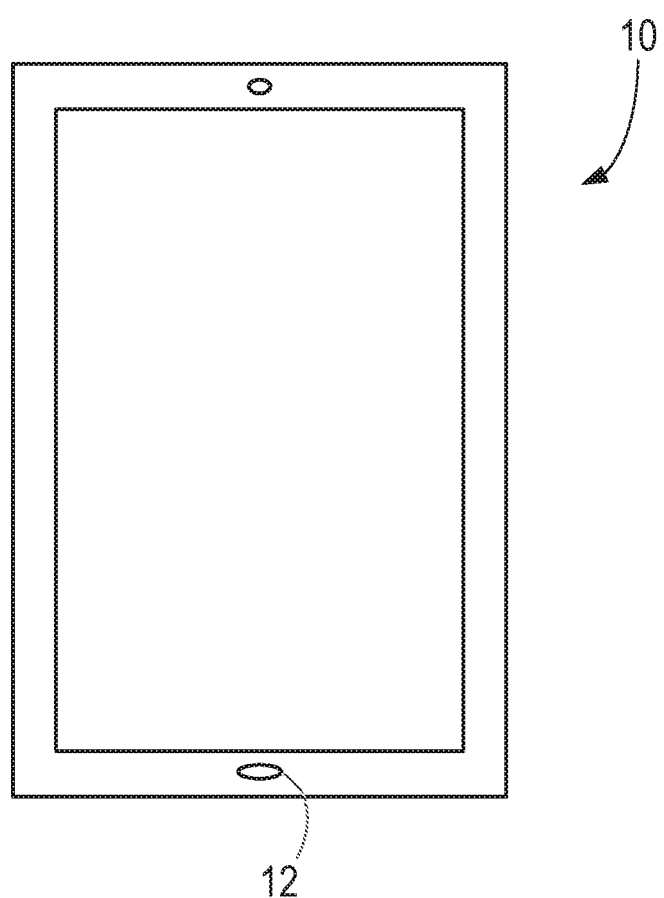
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10.

Figure 2:
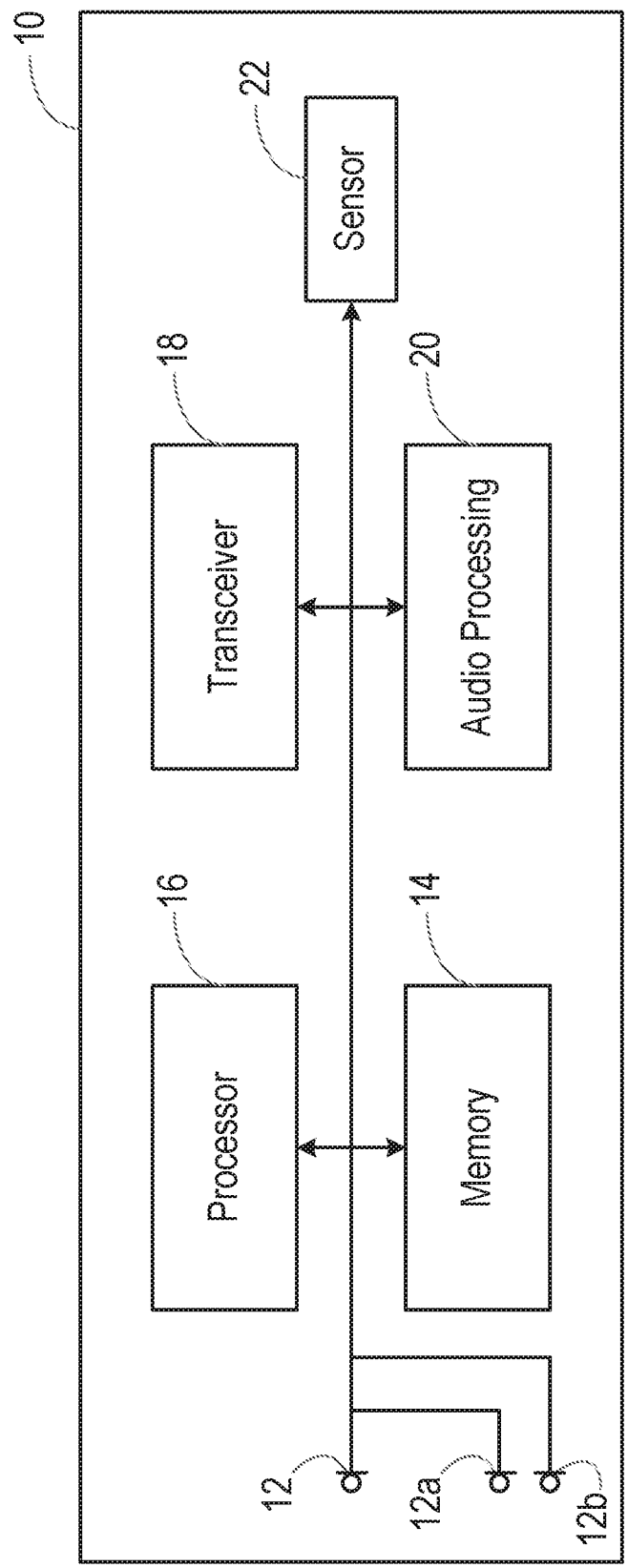
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

FIG. 2 also shows at least one sensor 22. In embodiments of the present invention, the sensor is a magnetic field sensor for detecting a magnetic field. For example, the sensor 22 may be a Hall effect sensor, that is able to provide separate measurements of the magnet field strength in three orthogonal directions.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

One attempt to deceive a voice biometric system is to play a recording of an enrolled user's voice in a so-called replay or spoof attack.

Figure 3:
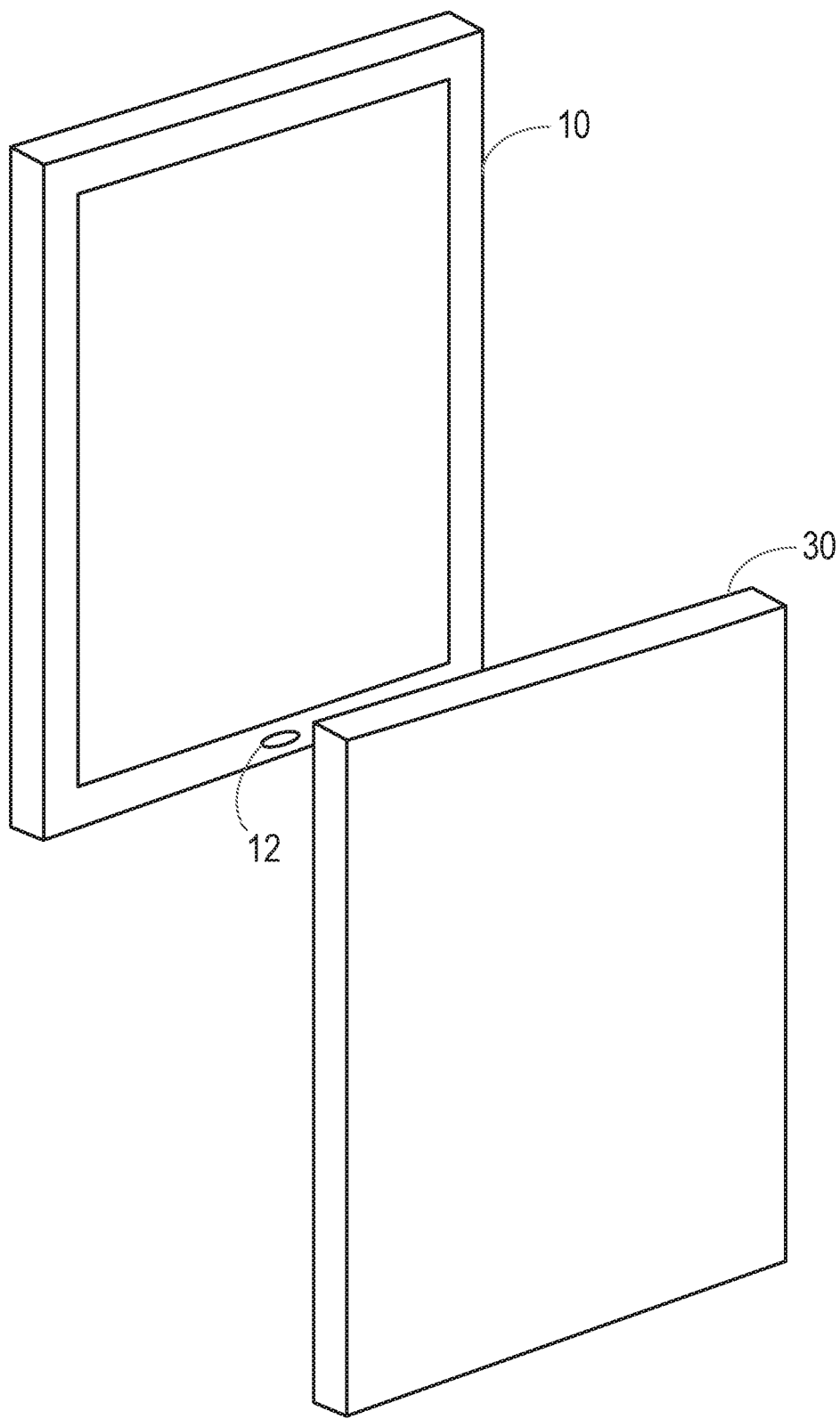
FIG. 3 illustrates a first situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to detect that the enrolled user's voice that it detects is a recording, the attacker will gain access to one or more services that are intended to be accessible only by the enrolled user.

It is known that smartphones, such as the smartphone 30, are typically provided with loudspeakers that are of relatively low quality due to size constraints. Thus, the recording of an enrolled user's voice played back through such a loudspeaker will not be a perfect match with the user's voice, and this fact can be used to identify replay attacks. For example, loudspeakers may have certain frequency characteristics, and if these frequency characteristics can be detected in a speech signal that is received by the voice biometrics system, it may be considered that the speech signal has resulted from a replay attack.

Figure 4:
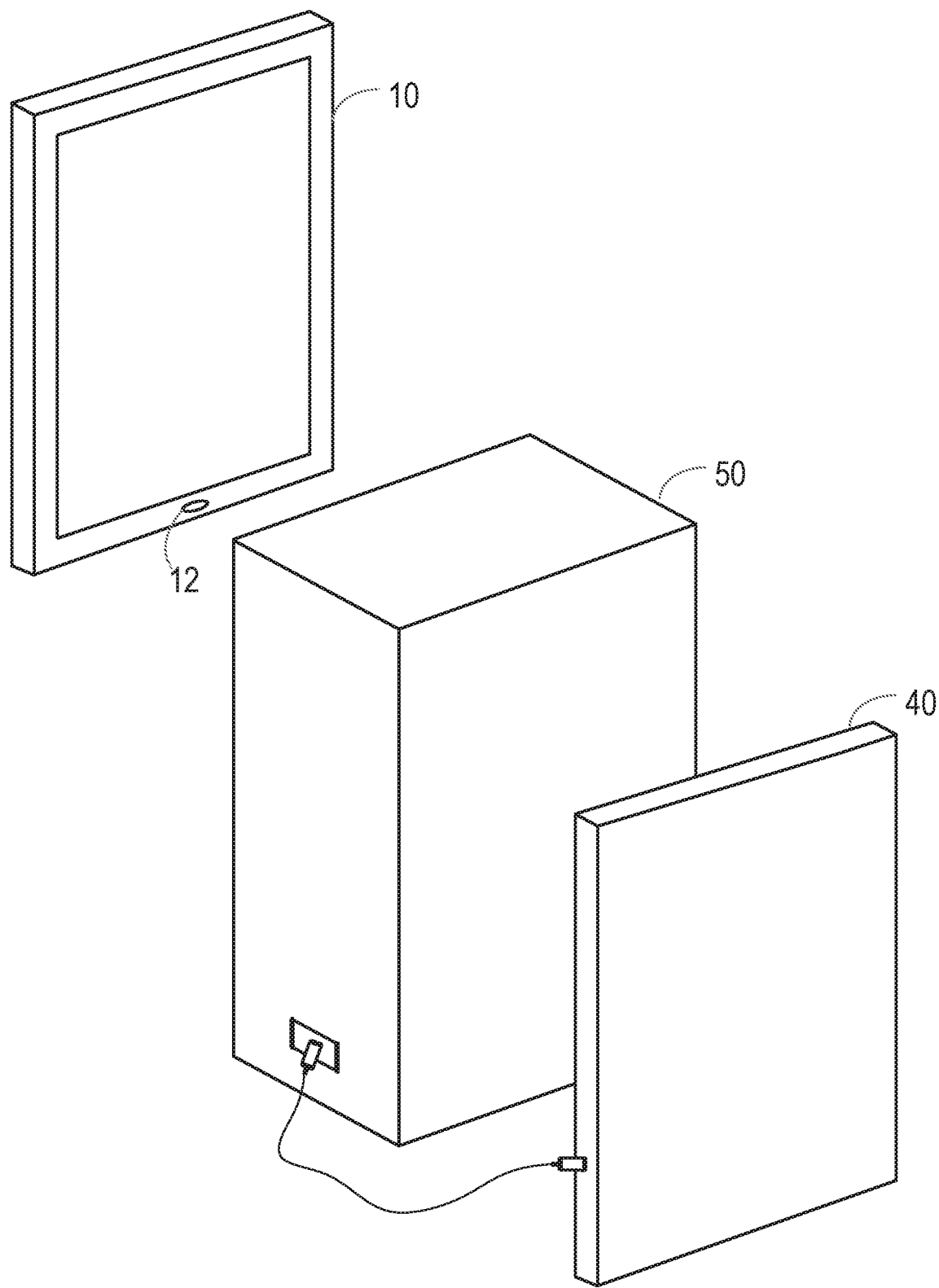
FIG. 4 illustrates a second situation in which a replay attack is being performed.

FIG. 4 shows a second example of a situation in which a replay attack is being performed, in an attempt to overcome the method of detection described above. Thus, in FIG. 4, the smartphone 10 is provided with voice biometric functionality. Again, in this example, the smartphone 10 is in the possession, at least temporarily, of an attacker, who has another smartphone 40. The smartphone 40 has been used to record the voice of the enrolled user of the smartphone 10.

In this example, the smartphone 40 is connected to a high quality loudspeaker 50. Then, the microphone inlet 12 of the smartphone 10 is positioned close to the loudspeaker 50, and the recording of the enrolled user's voice is played back through the loudspeaker 50. As before, if the voice biometric system is unable to detect that the enrolled user's voice that it detects is a recording, the attacker will gain access to one or more services that are intended to be accessible only by the enrolled user.

In this example, the loudspeaker 50 may be of high enough quality that the recording of the enrolled user's voice played back through the loudspeaker will not be reliably distinguishable from the user's voice, and so the audio features of the speech signal cannot be used to identify the replay attack.

However, it is appreciated that many loudspeakers, and particularly high quality loudspeakers, are electromagnetic loudspeakers in which an electrical audio signal is applied to a voice coil, which is located between the poles of a permanent magnet, causing the coil to move rapidly backwards and forwards. This movement causes a diaphragm attached to the coil to move backwards and forwards, creating sound waves. It is recognised here that, if a device such as the smartphone 10 is positioned close to a loudspeaker while it is playing back sounds, there will be corresponding changes in the magnetic field, which will be detectable by a magnetic field sensor 22.

Figure 5:
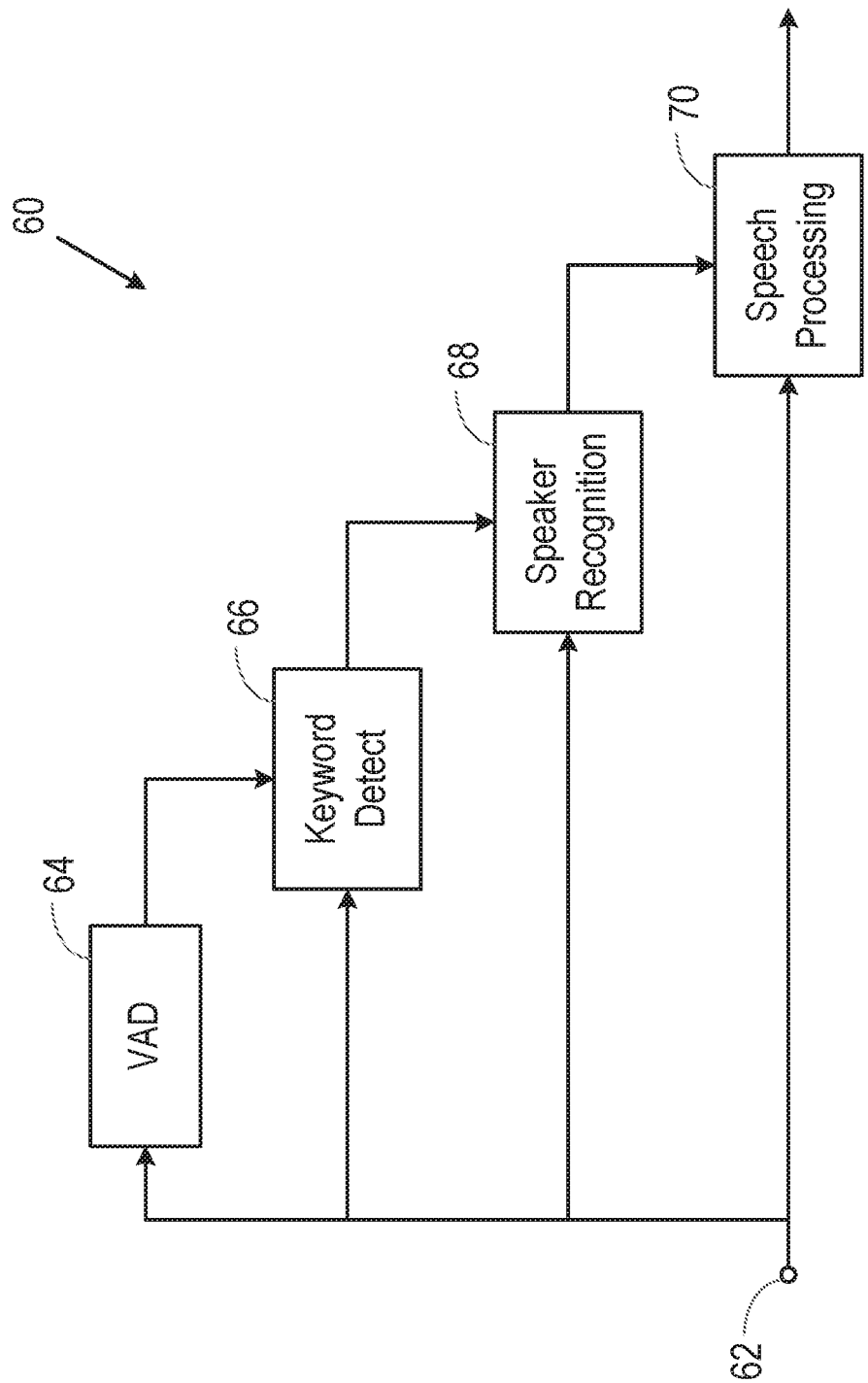
FIG. 5 is a block diagram of a speech processing system.

FIG. 5 illustrates a part of a speech processing system 60, for use in a device such as a smartphone 10 as shown in FIG. 2. Specifically, FIG. 5 shows an input 62, for receiving an audio signal, for example from one or more microphone 12 in a smartphone 10 as shown in FIG. 2.

In order to reduce power consumption, the speech processing system 60 operates in a progressive fashion. Thus, the audio signal is passed to a voice activity detection (VAD) block 64, which determines when the received audio signal contains a human voice.

When the VAD block 64 determines that the received audio signal contains human speech, it sends a signal to a keyword detection block 66 to initiate operation thereof.

When it is activated, the keyword detection block 66 receives the input audio signal, and determines whether the human speech contains a predetermined trigger phrase. For example, a smartphone might have a trigger phrase "hello phone", which the user must speak to activate the speech processing.

When the keyword detection block 66 determines that the human speech contains a predetermined trigger phrase, it sends a signal to a speaker recognition block 68 to initiate operation thereof.

When it is activated, the speaker recognition block 68 receives the input audio signal, and determines whether the human speech was spoken by an enrolled user of the device. For example, a smartphone may have just one or a few enrolled users, who are authorised to issue voice commands to the device, and the speaker recognition block 68 determines whether the detected human speech was spoken by that enrolled user or one of the enrolled users.

When the speaker recognition block 68 determines that the human speech was spoken by an enrolled user of the device it sends a signal to a speech processing block 70 to initiate operation thereof. The speech processing block 70 may be located in the same device as the other blocks shown in FIG. 5, or it may be located remotely in the cloud.

When it is activated, the speech processing block 70 receives the input audio signal, and determines the content of the received speech. For example, the speech processing block 70 may determine that the speech contains a command, and may then control some aspect of the operation of the device, or of a separate device, in response to that command.

As discussed above with reference to FIG. 4, one possible attack on such a system is that an attacker may play back a recording of the enrolled user speaking the predetermined trigger phrase. Without any system for detecting such a replay attack, the attacker may be able to issue commands that would be acted upon by the speech processing system 60.

Figure 6:
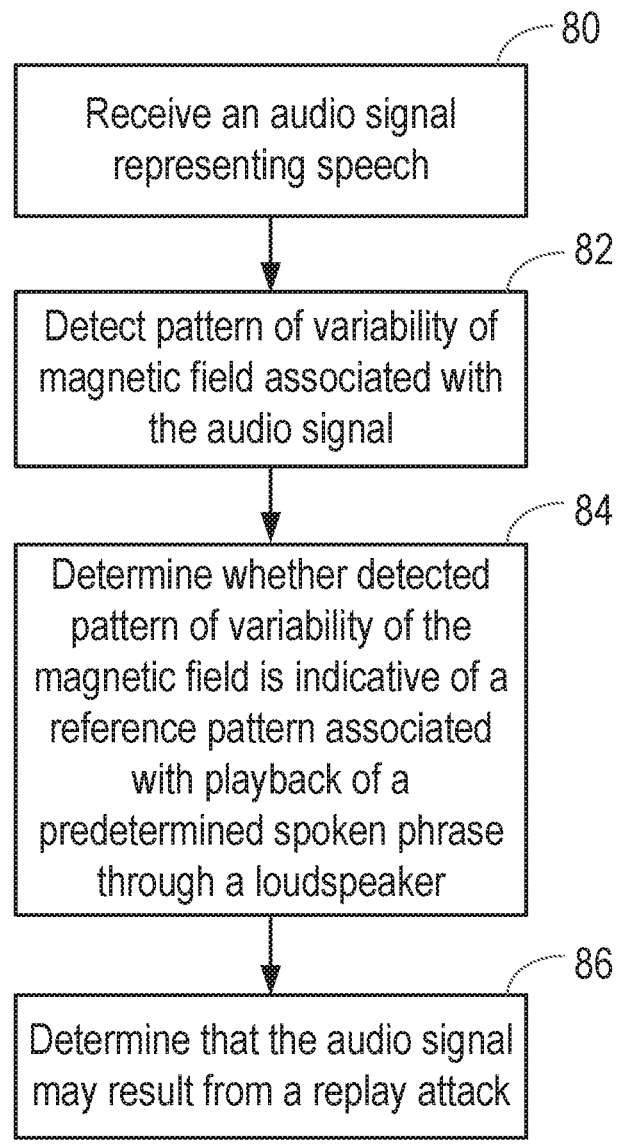
FIG. 6 is a flow chart illustrating a method in accordance with the invention.
Figure 7:
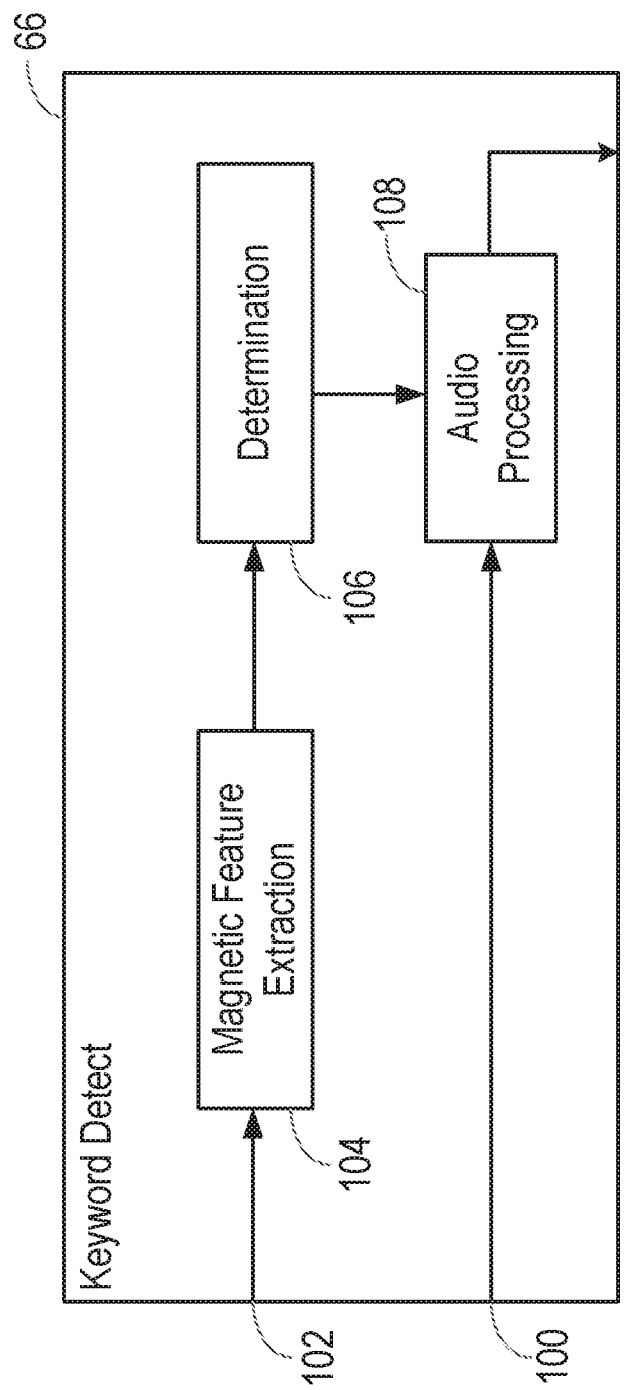
FIG. 7 is a block diagram of a system for implementing one method.

FIG. 6 is a flow chart, illustrating a method of detecting a replay attack on a voice biometrics system, and FIG. 7 is a block diagram illustrating functional blocks in the voice biometrics system. Specifically, FIG. 7 illustrates functional blocks in the keyword detection block 66.

Specifically, in step 80 in the method of FIG. 6, an audio signal is received on an input 100 of the keyword detection block 66 shown in FIG. 7. For example, in a device as shown in FIG. 2, the audio signal received on the input 100 may be the audio signal detected by the microphone 12, or may be the sum of the audio signals detected by the microphones if there is more than one.

At the same time, in step 82 in the method of FIG. 6, an input signal is received on an input 102 of the system shown in FIG. 7. The input signal received on the input 102 is received from a magnetometer. For example, when the method is performed in a device such as a smartphone or a tablet computer, the device will typically include a three-axis magnetometer, which generates an output signal containing separate measurements of the magnetic field strength in three orthogonal directions.

In some embodiments, the input signal received from the magnetometer is passed to a magnetic feature extraction block 104. For example, if the signal received from the magnetometer contains separate measurements of the magnetic field strength in three orthogonal directions, these can be combined to provide a single measurement of the magnetic field strength. The measurement of the magnetic field strength could be found as the square root of the sum of the squares of the three separate measurements of the magnetic field strength in the three orthogonal directions.

Further, the aim of the system is to determine any magnetic field that is generated by a nearby object such as a loudspeaker. In order to obtain the most useful information about this, one possibility is to process the input signal received from the magnetometer in order to remove the effects of the Earth's magnetic field. For example, this can be achieved by forming an average value of the magnetic field strength, for example over a period of seconds, minutes or hours, and subtracting this from each individual measurement to obtain an instantaneous measurement of the magnetic field generated by artificial sources.

Thus, in step 82 in the method of FIG. 6, after subtracting the static magnetic field from the magnetic field detected by the magnetometer, what is left is a pattern of variability of the magnetic field. If this occurs at substantially the same time as an audio signal is being received on the input 100 of the keyword detection block 66, then the pattern of variability of the magnetic field is considered to be associated in some way with the audio signal.

Relevant information about the pattern of variability of the magnetic field can then be obtained by the magnetic feature extraction block 104.

Figure 8:
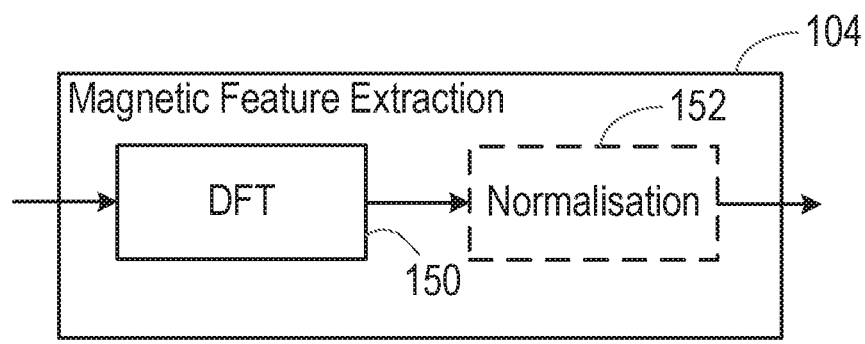
FIG. 8 is a block diagram illustrating a first element of the system of FIG. 7.

FIG. 8 is a block diagram illustrating a first form of the magnetic feature extraction block 104. Specifically, FIG. 8 shows the magnetometer signal, possibly after pre-processing to remove the effects of the Earth's magnetic field and obtain an instantaneous measurement of the magnetic field generated by artificial sources, being applied to a Discrete Fourier Transform (DFT) block 150. The output of the DFT block 150 may then optionally be normalised in a normalisation block 152. The normalisation consists of modifying at least one of the moments of the signal. For example, the first moment (mean) may be set to zero and the second moment (i.e. the standard deviation) may be set to unity.

Figure 9:
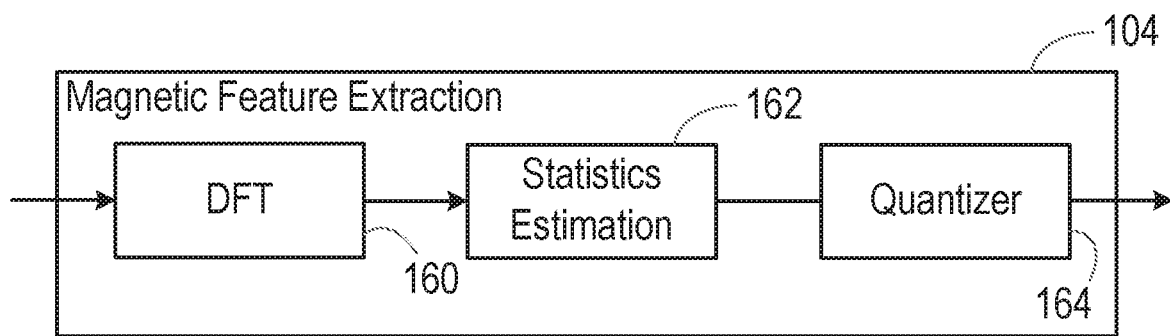
FIG. 9 is a block diagram illustrating an alternative form of the first element of the system of FIG. 7.

FIG. 9 is a block diagram illustrating a second form of the magnetic feature extraction block 104, in which a robust hash is performed. A robust hash is essentially a lossy compression function that gives similar scores for similar, but not necessarily identical, files. Specifically, FIG. 9 shows the magnetometer signal, possibly after pre-processing to remove the effects of the Earth's magnetic field and obtain an instantaneous measurement of the magnetic field generated by artificial sources, being applied to a Discrete Fourier Transform (DFT) block 160, which is used to filter the magnetometer signal. The output of the DFT block 160 is passed to statistics estimation block 162, which is used to estimate the statistics per band, and these are passed to a quantization block 164.

In these examples, a Discrete Fourier Transform is used, though other techniques such as Fast Fourier Transform (FFT) or Discrete Cosine Transform (DCT) can also be used.

If a pattern of variability of the magnetic field that is associated with an audio signal is detected, the process passes to step 84 of the method of FIG. 6, in which it is determined whether the detected pattern of variability of the magnetic field is indicative of a reference pattern associated with playback of a predetermined spoken phrase through a loudspeaker. Thus, in the system of FIG. 7, the detected pattern of variability of the magnetic field is passed to a determination block 106.

The determination may take any suitable form.

Figure 10:
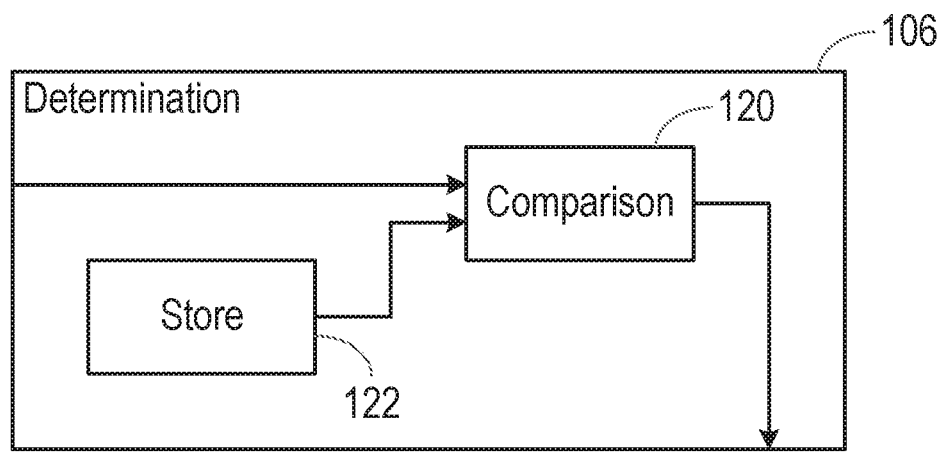
FIG. 10 is a block diagram of a system for implementing a part of the method.

FIG. 10 is a block diagram illustrating a first possible form of the determination block 106. Specifically, FIG. 8 shows the detected pattern of variability of the magnetic field, that is, the features extracted from the magnetometer signal by the feature extraction block 104, being passed to a first input of a comparison block 120 in the determination block 106. A store 122 is connected to a second input of the comparison block 120.

The store 122 may store a reference pattern, and this reference pattern may correspond to the pattern of variability of the magnetic field when the predetermined spoken phrase is spoken by a specific enrolled user, or may correspond to the average pattern of variability of the magnetic field when the predetermined spoken phrase is spoken by multiple speakers.

Figure 11:
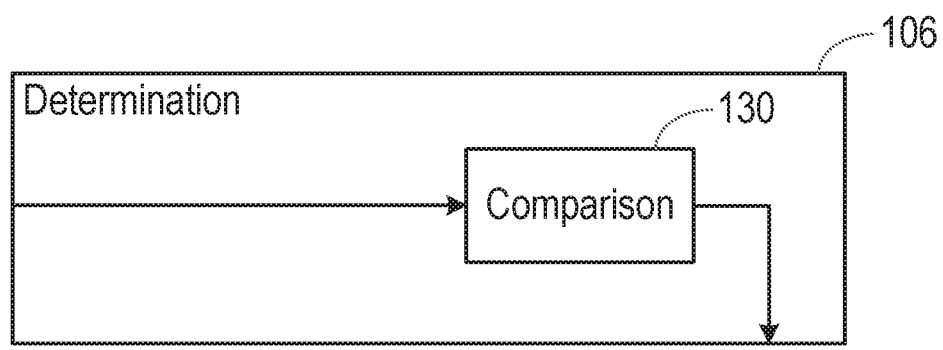
FIG. 11 is a block diagram of a system for implementing a part of the method.

FIG. 11 is a block diagram illustrating a second possible form of the determination block 106. Specifically, FIG. 11 shows the detected pattern of variability of the magnetic field being passed to a classifier block 130 in the determination block 106. The classifier block 130 operates to determine whether the detected pattern of variability of the magnetic field is indicative of a reference pattern of variability of a magnetic field that is associated with playback of the predetermined spoken phrase through a loudspeaker.

In these examples, features are extracted from the magnetometer signal, and compared with a reference pattern, either directly or in a classifier. In other examples, the magnetometer signal itself is passed to a suitably trained classifier to determine whether the signal contains features that indicate that the pattern of variability of the magnetic field is indicative of a reference pattern associated with playback of the predetermined spoken phrase through a loudspeaker.

To avoid the need to train the classifier 130 by playing back many examples of speech through a loudspeaker, the classifier may be trained using modelled data.

Figure 12:
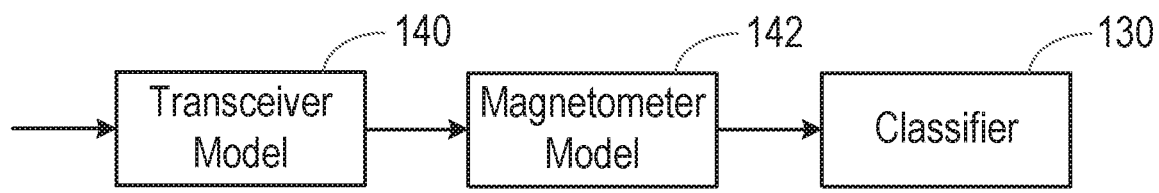
FIG. 12 is a block diagram of a system for implementing a part of a method.

FIG. 12 is a block diagram showing the training process.

The signal that is received from the magnetometer signal will typically have a sample rate in the region of 80-120 Hz. Therefore, if that signal does result from the playback of speech, it will represent a heavily under-sampled version of that speech. Further, the sample rate may not be constant, because the operation of the magnetometer is typically a low priority task in a device such as a smartphone.

Therefore, to obtain suitable training data for the classifier, signals are obtained that represent the voltage applied to a loudspeaker when the predetermined phrase is spoken.

These signals are input, in turn, to a transducer model 140, which maps the voltage applied to the loudspeaker to the magnetic field that the magnetometer senses. The transducer model must therefore take account of different types of loudspeaker that might plausibly be used in a spoof attack, and must also take account of different possible positions of the magnetometer relative to the loudspeaker.

The resulting signals are applied to a magnetometer model 142, which models the sampling process of the magnetometer (namely, the fact that the magnetometer may perform under-sampling, irregular sampling, or other possible sampling techniques).

This provides data, representing many possible magnetometer signals that can be obtained by playing back the predetermined phrase through a loudspeaker and detecting the resulting pattern of variability of the magnetic field through a magnetometer. This obtained data can then be used to train the classifier 130.

As shown in FIG. 11, the trained classifier can then be used to determine whether a newly detected pattern of variability of the magnetic field is likely to have been the result of the predetermined phrase being played back through a loudspeaker.

If it is determined in step 84 of the method of FIG. 6 that the detected pattern of variability of the magnetic field is indicative of a reference pattern associated with playback of a predetermined spoken phrase through a loudspeaker, the process passes to step 86, in which it is determined that the received audio signal may be associated with a replay attack.

This determination may be used on its own to determine that the received audio signal results from a replay attack. Alternatively, the determination may be combined with other factors to reach a decision as to whether the received audio signal results from a replay attack.

In the system of FIG. 7, the audio signal received on the input 100 of the keyword detection block 66 is passed to an audio processing block 108.

In most cases, the audio processing block 108 of the keyword detection block 66 determines whether the audio signal contains a predetermined trigger phrase and, if so, it sends a signal to the speaker recognition block 68 of FIG. 5 to initiate operation thereof.

However, if the determination block 106 determines (based only on the pattern of variability of the magnetic field or based partly on the pattern of variability of the magnetic field) that the received audio signal may result from a replay attack shown in FIG. 7, then the determination block 106 may send a signal to the audio processing block 108 in order to prevent its operation.

Thus, if it is determined from the magnetic field measurements that the audio signal may result from a replay attack, the keyword detection block 66 does not attempt to detect the presence of the predetermined trigger phrase.

The method has been described so far herein with reference to a specific example in which it is determined whether the detected pattern of variability of the magnetic field is indicative of a reference pattern associated with playback of a predetermined spoken phrase through a loudspeaker, and there is only one such predetermined phrase, for example a trigger phrase that is used by an enrolled user to activate a device. However, there may be multiple predetermined spoken phrases, and the method can test whether the detected pattern of variability of the magnetic field is indicative of a reference pattern associated with playback of any of these predetermined spoken phrases through a loudspeaker. Where the determination block 106 includes a classifier, as shown in FIG. 11, this requires more training data for the classifier.

More generally, the method can test whether the detected pattern of variability of the magnetic field is indicative of playback of human speech.

Figure 13:
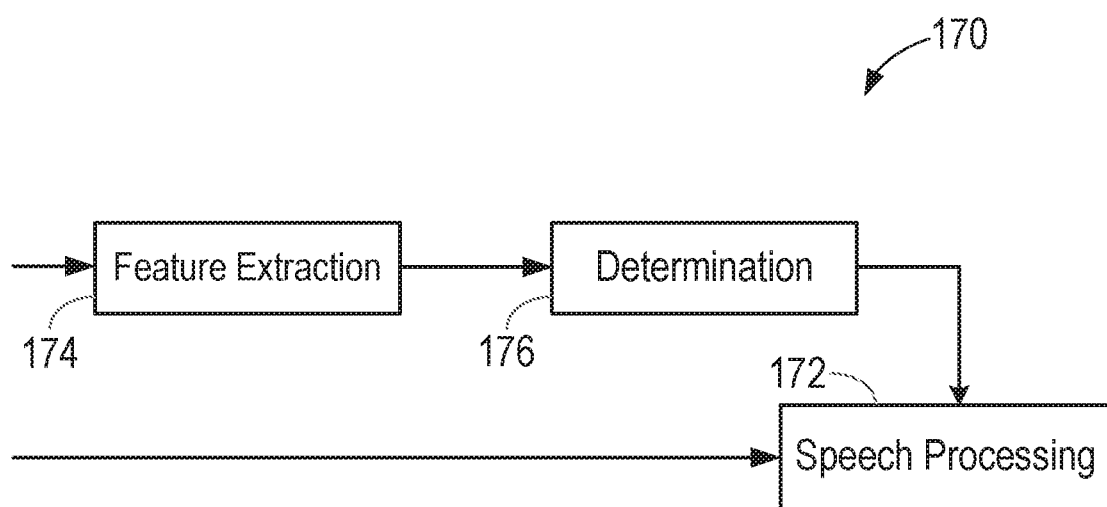
FIG. 13 is a block diagram illustrating a speech processing system.
Figure 14:
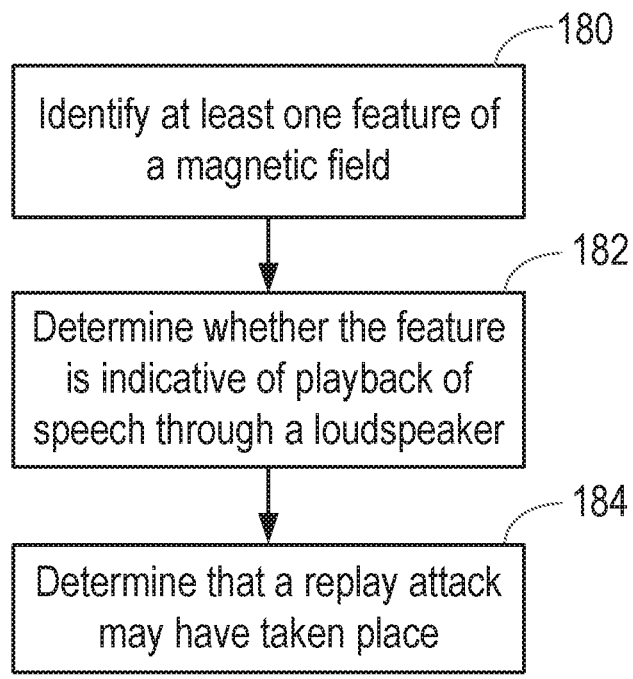
FIG. 14 is a flow chart illustrating a method performed in the system of FIG. 13.

FIG. 13 is a block diagram illustrating a speech processing system 170, and FIG. 14 is a flow chart illustrating a method performed in the system.

An audio signal that may contain speech is passed to a speech processing block 172. This may take any suitable form. For example, it may be a keyword detection block, a speaker recognition function, a speech recognition block, or any other function.

A magnetometer signal, possibly after pre-processing to remove the effects of the Earth's magnetic field and obtain an instantaneous measurement of the magnetic field generated by artificial sources, is applied to a magnetic feature extraction block 174.

Thus, in step 180 of the process shown in FIG. 180, at least one feature of the detected magnetic field is identified.

The magnetic feature extraction block 174 may for example extract Mel Frequency Cepstral Coefficients (MFCCs) from the magnetometer signal.

Figure 15:
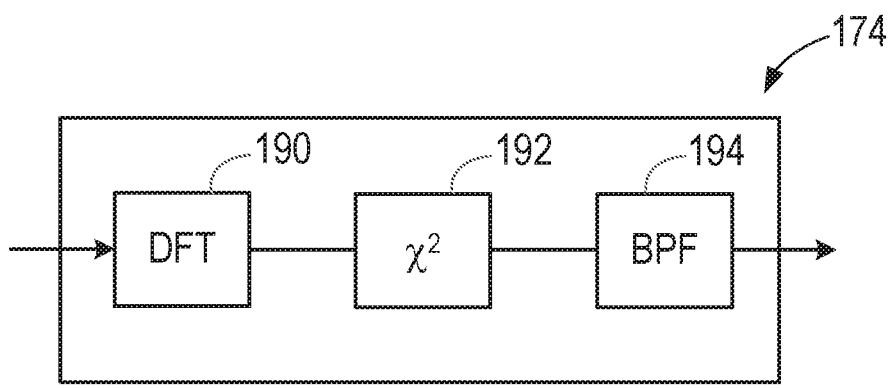
FIG. 15 shows a possible form of a block in the system of FIG. 13.

Alternatively, FIG. 15 shows a possible form of the magnetic feature extraction block 174. This operates by looking for features that are characteristic of speech, which is typically modulated at the syllabic rate or articulation rate, which may for example be in the region of 1-15 Hz, and more specifically in the region of 2-10 Hz, and is typically around 4 Hz.

In FIG. 15, the magnetometer signal is filtered into multiple bands. FIG. 15 shows this filtering being performed by a Discrete Fourier Transform (DFT) block 190, but alternatively a filter bank may be used.

The filtered signal is passed to a block 192 in which the signal is converted to energy, by squaring it.

Each energy band is then passed to a band pass filter (BPF) block 194, with a pass band centred on a suitable syllabic rate, for example 4 Hz. The syllabic rate, or articulation rate, may be chosen to correspond to a typical rate, for example for general speech or for that specific type of speech or speaker. Alternatively, a value of a syllabic rate, or articulation rate, may be determined by analysis of speech that is detected at the same time as the magnetic field is being detected (for example in the speech processing block 172 of FIG. 13). That rate may then be used to set the pass band of the band pass filter (BPF) block 194.

The modulation energy at the output of the BPF can then be measured, for example with a simple threshold or with a more advanced pattern recogniser such as neural net.

In block 176 of the system shown in FIG. 13, and in step 182 of the method shown in FIG. 14, it is then determined whether the at least one identified feature of the detected magnetic field is indicative of playback of speech through a loudspeaker. This may involve determining whether the degree of modulation of the magnetometer signal at the syllabic rate is indicative of playback of speech through a loudspeaker.

If so, then it is determined in step 184 that a replay attack may have taken place. In that event, any suitable output may be provided to a user.

In the case of a system as shown in FIG. 13, the output may be used to gate the speech processing, such that the received audio signal is not processed as planned, because it is assumed that it may be the result of a replay attack.

There are therefore disclosed methods and systems that can be used for detecting situations that may indicate that a received audio signal is the result of a replay attack.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of detecting a replay attack in a speaker recognition system, the method comprising:
   receiving an audio signal comprising speech;
   receiving a magnetometer signal;
   determining a syllabic rate or an articulation rate of the speech;
   detecting modulation of at least one feature of the magnetometer signal at the syllabic rate or the articulation rate;
   determining based on the detecting that the at least one identified feature of the detected magnetic field is indicative of playback of speech through a loudspeaker; and
   determining that a replay attack may have taken place.

2. The method of claim 1, wherein the syllabic rate or the articulation rate of the speech are determined for speech detected at the same time as the magnetometer signal.

3. The method of claim 1, wherein the determined syllabic rate or articulation rate is used to set a passband frequency range for detecting modulation of the at least one feature of the magnetometer signal.

4. A method as claimed in claim 1, wherein the audio signal is received at substantially the same time as the magnetic field is detected, the method further comprising, if it is determined that the at least one identified feature of the detected magnetic field is indicative of playback of speech through a loudspeaker, determining that the audio signal may result from said replay attack.

5. A method as claimed in claim 1, wherein the magnetometer signal is received from a magnetometer, the method further comprising:
   performing a Discrete Fourier Transform on the magnetometer signal.

6. A method as claimed in claim 1, comprising determining whether a detected pattern of variability of the magnetic field is indicative of a reference pattern associated with playback of a predetermined spoken phrase through a loudspeaker.

7. A method as claimed in claim 6, wherein determining whether the detected pattern of variability of the magnetic field is indicative of a reference pattern associated with playback of a predetermined spoken phrase through a loudspeaker comprises:
   comparing the detected pattern of variability of the magnetic field with a stored reference pattern.

8. A method as claimed in claim 7, wherein the stored reference pattern corresponds to the predetermined spoken phrase, as spoken by a specific enrolled user, or as spoken by multiple speakers.

9. A method as claimed in claim 6, wherein determining whether the detected pattern of variability of the magnetic field is indicative of a reference pattern associated with playback of a predetermined spoken phrase through a loudspeaker comprises:
   passing the detected pattern of variability of the magnetic field to a classifier that has been trained with inputs obtained from playback of the predetermined spoken phrase through a loudspeaker.

10. A device comprising an apparatus as claimed in claim 9, wherein the device comprises a mobile telephone, headset, an audio player, a video player, a mobile computing platform, a games device, a remote controller device, a toy, a machine, or a home automation controller or a domestic appliance.

11. A non-transitory computer readable storage medium having computer-executable instructions stored thereon that, when executed by processor circuitry, cause the processor circuitry to perform a method according to claim 1.

12. An apparatus comprising processing circuitry and a non-transitory machine-readable medium storing instructions which, when executed by the processing circuitry, cause the apparatus to:
   receive an audio signal comprising speech;
   receive a magnetometer signal;
   determine a syllabic rate or an articulation rate of the speech;
   detect modulation of at least one feature of the magnetometer signal at the syllabic rate or the articulation rate;
   determine based on the detecting that the at least one identified feature of the detected magnetic field is indicative of playback of speech through a loudspeaker; and
   determine that a replay attack may have taken place.

13. The apparatus of claim 12, wherein the syllabic rate or the articulation rate of the speech are determined for speech detected at the same time as the magnetometer signal.

14. The apparatus of claim 12, wherein the determined syllabic rate or articulation rate is used to set a passband frequency range for detecting modulation of the at least one feature of the magnetometer signal.

15. An apparatus as claimed in claim 12, wherein the audio signal is received at substantially the same time as the magnetic field is detected, the instructions further causing the apparatus to:
if it is determined that the at least one identified feature of the detected magnetic field is indicative of playback of speech through a loudspeaker, determine that the audio signal may result from said replay attack.

16. An apparatus as claimed in claim 12, wherein the magnetometer signal is received from a magnetometer, the instructions further causing the apparatus to:
perform a Discrete Fourier Transform on the magnetometer signal.

17. An apparatus as claimed in claim 12, the instructions further causing the apparatus to:
determine whether a detected pattern of variability of the magnetic field is indicative of a reference pattern associated with playback of a predetermined spoken phrase through a loudspeaker.

18. An apparatus as claimed in claim 17, wherein determining whether the detected pattern of variability of the magnetic field is indicative of a reference pattern associated with playback of a predetermined spoken phrase through a loudspeaker comprises:
comparing the detected pattern of variability of the magnetic field with a stored reference pattern.

19. An apparatus as claimed in claim 18, wherein the stored reference pattern corresponds to the predetermined spoken phrase, as spoken by a specific enrolled user, or as spoken by multiple speakers.

20. An apparatus as claimed in claim 17, wherein determining whether the detected pattern of variability of the magnetic field is indicative of a reference pattern associated with playback of a predetermined spoken phrase through a loudspeaker comprises:
passing the detected pattern of variability of the magnetic field to a classifier that has been trained with inputs obtained from playback of the predetermined spoken phrase through a loudspeaker.

* * * * *

UNITED STATES PATENT AND TRADEMARK OFFICE
CERTIFICATE OF CORRECTION

| | |
|---|---|
| PATENT NO. | : 11,704,397 B2 |
| APPLICATION NO. | : 17/074743 |
| DATED | : July 18, 2023 |
| INVENTOR(S) | : John Paul Lesso |

It is certified that error appears in the above-identified patent and that said Letters Patent is hereby corrected as shown below:

In the Claims

In Column 12, Line 39, in Claim 10, delete "comprising an apparatus" and insert -- for performing the method --, therefor.

Signed and Sealed this
Seventh Day of November, 2023

Katherine Kelly Vidal
*Director of the United States Patent and Trademark Office*